US006521345B1

(12) United States Patent
Lewin

(10) Patent No.: US 6,521,345 B1
(45) Date of Patent: Feb. 18, 2003

(54) ENVIRONMENTALLY PROTECTED OUTDOOR DEVICES

(75) Inventor: Scott J. Lewin, Pembroke Pines, FL (US)

(73) Assignees: Scott Jay Lewin, Pembroke Pines, FL (US); Stanley Kotler, Hialeah, FL (US); Alan H. Kepke, Hialeah, FL (US)

( * ) Notice: Subject to any disclaimer, the term of this patent is extended or adjusted under 35 U.S.C. 154(b) by 0 days.

(21) Appl. No.: 09/795,444

(22) Filed: Mar. 1, 2001

(51) Int. Cl.$^{7}$ .......................... B32B 27/38; B32B 9/04; G07F 9/10

(52) U.S. Cl. .................... 428/413; 428/423.1; 428/447; 428/474.4; 428/475.5; 428/500; 428/523; 194/350; 194/900

(58) Field of Search ............................. 428/413, 423.1, 428/447, 474.4, 475.5, 500, 523; 194/350, 900

(56) References Cited

U.S. PATENT DOCUMENTS 5,618,860 A 4/1997 Mowrer et al.
6,015,613 A * 1/2000 Kinlen et al. ............... 427/456
6,203,928 B1 * 3/2001 Lewin ........................ 194/350

* cited by examiner

*Primary Examiner*—Robert Dawson
*Assistant Examiner*—Michael J Feely
(74) *Attorney, Agent, or Firm*—Lowe Hauptman Gilman & Berner, LLP

(57) ABSTRACT

An improved protective coating, for parking meters or other equipment that is subject to environmental deterioration and/or vandalism, having thereon at least a three layer coating of a composite thickness sufficiently thick to avoid pinholes and sufficiently thin to avoid crazing and cracking due to variations in the ambient environment. The coating has a conventional lower layer of zinc on or proximate to the equipment surface (in the alternative the substrate may be a zinc part); a second layer of a thermosetting polymer that has been applied by a powder coating electrostatic method, and a third, top, coating of an epoxysiloxane polymer. The total coating thickness should preferably not exceed about 6 mils.

13 Claims, No Drawings

ENVIRONMENTALLY PROTECTED OUTDOOR DEVICES

FIELD OF THE INVENTION

This invention is directed to the protection of articles and devices that are normally subject to oxidative degradation and/or vandalism damage. It is common for the devices being protected according to this invention to be used out of doors. Examples of such devices are parking meters, traffic signs, toll collection baskets, and the like. Some conventional, oxidation sensitive devices are used indoors or out. Examples of these devices are vending machines, public telephones, and the like. This invention is directed to the protection of any or all of these types of apparatus that are intended to reside in public, or quasi-public, areas, such as on the street, in hallways, etc. The invention is also applicable to protect elements (that is less than the whole of the device) of devices that are subject to vandalism or oxidative degradation and/or humidity damage, even where the whole of the device has certain elements that are not subject to such damage.

While at the present time, most, if not all, of the devices to which the protection of this invention is directed are coin or card operated, in the future, many of these coin and/or card operating devices will be replaced by, or modified to accept, wireless communication, such as from a cell phone or the like. In fact, currently, such cradless and coinless operated outdoor equipment is already in the form of “SPEEDPASS”, the operator of gasoline dispensing apparatus that is marketed by Mobil Oil. It is also used to charge the payment of tolls to the driver’s credit card.

This invention is directed to all such outdoor, oxidation and/or vandalism sensitive, devices regardless of how they are activated or initiated. It more particularly is directed to improving the resistance of such devices to environmental damage as well as resisting damage due to intentional vandalism or accidental collision. While this invention is applicable to such outdoor devices regardless of their chemical composition, it is most efficiently protective of such devices that are made up least partially of oxidation sensitive ferrous metals and zinc based structure.

BACKGROUND

For ease of understanding and explanation, parking meters, and structural elements thereof, will hereafter be used as illustrative of all of the oxygen, humidity and vandalism sensitive devices to which this invention is directed. The use of such illustrative elements in this specification is not intended to be limiting on the scope of the instant invention, but rather should be taken as a convenient short hand method of defining and describing this invention.

Parking meters, vending machines, public telephones and the like, comprised in whole or in part of oxidation sensitive ferrous metal, or other oxidation sensitive material, are well known to be subject to damage through environmental deterioration because of rusting, crazing, cracking, pitting and the like. All devices that are generally available to the public are routinely subject to abuse by reason of vandalism or accidental collision. It is well known that outdoor devices are often scratched or dented because of malicious mischief or as a result of just plain accidental encounters, for example by reason of an automobile running into a parking meter or a gasoline pump of a toll collection basket, etc. The readily oxidizable ferrous metal parts of a device, even if they are intended for use inside a structure and not out doors, are still subject to environmental deterioration since the devices are not usually hermetically sealed. In any case, possible damage because of vandalism can always be a problem that needs to be addressed.

The art is replete with means for preventing, or at least reducing, the impact of, such damage by applying coatings made of various compositions at least to exposed ferrous metal members of the outdoor devices. One very common protective method is to galvanize ferrous metal parts, i.e. by applying a zinc based coating thereon followed by conventional galvanizing. Galvanizing certainly assists in preventing or at least retarding corrosive action of the environment and thereby increases the life of ferrous metal parts that have been galvanized. However, galvanizing is not the ultimate protection. It is intended that parking meters be left in place for a very long time, on the order to 50 years. Clearly, their protection must be more than minimal.

It is well known to apply oxidation and scratch resistant polymeric coatings over both the oxidizable ferrous metal and other structural elements of outdoor devices in order to protect them from damage. These polymeric coatings can be applied directly to the metal, e.g. coating directly on oxidizable ferrous metal surfaces, or they can be applied over an intermediate coating layer of some other composition, for example on top of a zinc galvanizing layer. Multiple polymeric layers are also generally known, although these have not been applied to parking meters and the like. In addition to polymeric coatings that can be applied by brushing, spraying or otherwise, it is known to apply suitable coatings over devices or parts thereof by the use of so-called powder application. Both cationic as well as anionic electrocoating application of polymeric coatings, such as specially formulated paint, is a well known method employed in the automobile industry to coat parts of cars that are not readily accessible, such as the inside of rocker panels. Both cationic and anionic electrocoating techniques are generally well known.

Powder coating is carried out by depositing an appropriately formulated powder on the part being coated, applying a d.c. electrostatic charge of opposite polarity to the powder and the substrate, respectively, heating the powder, suitably through the substrate especially if it is a good heat conductor, sufficient to melt the powder and to cause it to flow and spread out to cover the substrate to a film thickness that prevents, or at least substantially reduces, the advent of pinholes or surface cracks and crazing in the resultant coating, and, after the powder has become a substantially continuous coating, cooling the coated substrate and thereby solidifying the coating and adhering it to the substrate. The object here is to provide a coating that is of minimal thickness sufficient to insure substantially complete coverage that will resist environmental attack on the surface portions of the substrate that would otherwise be exposed to the atmosphere, and to resist or at least ameliorate the adverse effects of vandalism or accidental collision. Further, the coating should be of a tough material that tends to prevent penetration by sharp objects such as a knife or a nail, and preferably of a material that tends to self heal. The tougher the coating material is, the thinner it can be in order to provide good protection. Thus, the coating should have a minimal thickness sufficient to substantially prevent, collision, malicious scratching or atmospheric attack. In general, non-epoxy, meltable polymer coating compositions, such as those set forth in the above identified parent application, are suitable for this use. They are conveniently applied as a powder and converted into a thin protective thermosetting polymer film by the above described process.

Certain applicable prior art is disclosed in the parent application/patent, and such disclosure is incorporated herein by reference. The parent application/patent also discloses very effective coatings for ferrous metal parts that are intended for use in an outdoor environment. These coatings comprise multiple layers including: a hot dipped zinc intermediate layer, covered by an electrostatically applied non-epoxy, organic, electrically insulating thermosetting layer that had been applied by a powder coating method. This improved product has been found to be an excellent preventor of environmental and other damage. However, as with all things, improvements are to be desired.

OBJECTS AND SUMMARY OF THE INVENTION

One important object of this invention is to provide an improved coating for protection of oxidizable metal substrates, particularly ferrous metal members, or devices that are generally intended for use in contact with the atmosphere, especially outdoors, against environmental and other damage.

Another object of this invention is to provide an improved multi layer coating for protection of oxidizable ferrous metal substrates against environmental damage, such as corrosion.

It is a further object of this invention to provide a novel means of protecting oxadizable metal substrates from all sorts of damage that can be caused by accidental or intentional exposure to the atmosphere and/or vandalism.

Other and additional objects will become apparent from a consideration of this entire specification and the claims appended hereto.

In accord with and fulfilling the above objects, one aspect of this invention comprises a device or other object that is intended to be put into service, and continue to see service over an extended period of time, and that comprises at least one part or member that is subject to oxidation by the ambient atmosphere and that may also be subject to damage as a result of collision or vandalism and that has been protected by application of the multilayer coating of this invention. The device at least partially comprising a member (s) comprising at least one metal that is subject to detrimental attack by ambient atmosphere, such as an oxidizable ferrous metal. It is known to coat such metal member(s) with a succession of protective layers including a zinc primary coating, and then a non-epoxy thermosetting polymeric coating that is suitably applied in a powder form to an electrostatically charged surface to be coated, thereby heating the powder sufficient to cause it to flow over the substrate surface, and forming a coherent protective layer on top of the zinc primer coating. In accord with this invention, the specific nature of the zinc antioxidant layer is not critical. Substantially any anti-oxidation initial coating will be suited to use in this invention and is considered to be within the scope of the appended claims, provided that it adheres tenaciously to the substrate. One particular embodiment of this invention envisions a suitable substrate having thereon, as a first coat, a galvanized zinc primary coating layer, as a second coat, an epoxy free, preferably polyurethane, coating layer, that has preferably been applied by a powder coating, electrostatic technique, and as a top layer, the silicon containing product of curing a suitable composition.

An aspect of the departure of the instant invention from the prior art is to apply as a top coating, an epoxy polysiloxane over the non-epoxy thermosetting polymer. That epoxy polysiloxane top coating is preferably the product of curing a composition comprising: a resin component comprising: at least: an epoxy resin, a polysiloxane, an organooxysilane; a hardener component; and a catalyst component. The top coat layer may also contain a pigment or dye component if the esthetic nature of the final product suggests that a particular color, design or degree of opacity is appropriate. Where appropriate, solid aggregate materials may be incorporated into the top coating composition. These aggregate materials may be simply opacifying agents, such as calcium carbonate for example, or they may be decorative in nature. Incorporation of aggregate materials in the top coating also can tend to reduce damage caused by vandalism, such as scratching, because the aggregate tends to blunt the blade of the vandalizing tool and keep it from going too deep.

One aspect of this invention envisions the repair and reconditioning of outdoor equipment, such as parking meters, that comprise zinc parts or tenaciously adhered zinc layers on oxidizable parts. As part of such reconditioning operation, it is important to remove substantially all of the oxidation products that are present on elements of the equipment in need of refurbishing. This can be done by mechanical means, such as brushing or sand blasting or the like. It can also be done by chemical means such as by treating the equipment with a suitable stripper. Two such chemical strippers are sold commercially by the Oakite Chemical Company, and are catalogued as product Oakite Stripper EPA and Oakite Stripper #156. In this embodiment of this invention, the old equipment can be grossly stripped of oxidation product by mechanical means, and then it can be chemically treated to remove even the small amount of oxidation products that may remain in places that are hard to reach by mechanical means, such as small crevices and tight corners.

Thus, this invention encompasses:

- a method of preparing new equipment for outdoor service by applying a multi layer protective coating on surface (s) thereof in need of protection against oxidation, humidity conditions, vandalism or the like;
- a method of refurbishing older equipment, to make it capable of continued service, by first removing old coatings and oxidized parts, replacing worn out parts and resizing parts so that they work efficiently in their intended fashion, and then applying a multilayer protective coating; and
- the multilayer coated (oxidation and vandalism protected) equipment itself, whether new or refurbished.

One important aspect of the multilayer coating of this invention is the top coat. Reference is here made to U.S. Pat. No. 5,618,860 that discloses a family of compositions that have been found to be exceptionally well suited to use as the top coat layer of the multilayer protective coating of this invention. The entire contents of this '860 patent are incorporated herein by reference.

In another aspect of this invention, a suitably protected product is constituted of a member in need of protection, a zinc rich substrate either on the member in need of protection, or as the composition of that member; a primary thermosetting polymeric layer, that is preferably not a polyepoxide, and that has preferably been applied electrostatically from a suitably formulated powder, disposed on and adhered to the zinc rich substrate, and an epoxy polysiloxane top layer, that may or may not have dye, pigment or filler therein, applied over, and adhered to, the primary polymeric coating. The thickness of the total coating composition is selected to be as small as practical consistent with the need to protect the underlying structural member against environmental damage and vandalism. It has been found that about 2.5 mils thickness is a suitable minimum. However, it is possible that in some applications, lesser total coating thicknesses may suffice or, in the alternative, some applications may call for greater thicknesses of total protective coating. For example, where the device being protected is in a sheltered environment, such as is common for ATM machines and most vending machines, it may be satisfactory to apply pin-hole free coatings that are only about 2 mils thick. On the other hand, protection for outdoor telephones and their booths, or for parking meters and similar equipment such as ganged parking control as sometimes is found in parking lots, or for toll collecting apparatus, may require greater protective coating thicknesses of about 3 mils or even more in some cases. Further, the thickness of the protective coating of this invention will be a function of the environment to which the device is subjected. Where there are great variations in ambient temperature, the composite of all of the layer(s) may be suitably reduced in total thickness so that crazing and cracking induced by temperature variations will be limited. Where there is a high concentration of salt in the ambient environment, such as in installations that are at or very near the ocean, thicker layers may be required. The overriding consideration in determining the thickness of the protective coating of this invention is that it function against the amount of environmental or vandalism damage (oxidation, salt corrosion, scratching and the like) the device is likely to be subjected to. Further, the thickness is also a function of the toughness or brittleness of the polymeric coating layers. The more brittle the coating, the thinner it must be to avoid cracking and crazing as a function of the temperature and humidity induced expansion and contraction of the coating elements and of the underlying substrate. Thus, the minimum coating thicknesses set forth above should be considered to be exemplary and preferable, but not necessarily limiting on the scope of this invention. It is to be understood that specific thickness of coatings layer(s) will depend on the specific danger that is being protected against.

DETAILED DESCRIPTION OF THE INVENTION

The parking meters to which the protective aspect of this invention is applied can be made up of, for example, a cast iron head and a cast iron vault with a door to access the money deposited therein. It can also be made up of a ZAMAC cast head and a cast iron vault with a door to provide access to the coin collecting receptacle. Alternatively, the parking meter could comprise a ZAMAC cast head and a ZAMAC cast coin vault. This description is not considered to be limiting, but rather is illustrating to the types of parking meters to which this invention may profitably be applied. Any of these meters can be mounted on an aluminum, steel, galvanized steel, or the like post. A plurality of meters can be mounted on a single post through the use of a conventional T or Y connector.

The protective coating of this invention has been set forth above to comprise two (2) distinct layers disposed sequentially on a zinc rich substrate which, in turn may be disposed on a structural or other part in need of protection. The structural or other element being protected by the zinc rich substrate may be a part of a device, or an entire device. The surface of the element in need of protection may be the outside covering of the device. The element may be wholly made of zinc, and thus not have a substrate structural part that the zinc is protecting, or it may be a part of a device that is made of some other material, such as an oxidizable ferrous metal, that has been coated with a zinc rich material, such as by galvanizing or applying a zinc rich primer for example. In either case, the specific nature of the ultimate substrate is not critical to the practice of this invention. Rather, it is the zinc rich surface of the underlying part, whether the zinc rich surface is provided by coating a substrate or is a wholly zinc part, that is the composition that underlies the sequential layers of protective polymeric coating of this invention. For the remainder of this specification, it will be assumed that any zinc rich surface is the starting point for the application of the multilayer polymeric protective coating of this invention, and the part or device under the zinc rich surface will not be further described. Any such part of any composition, having a surface that is coated with zinc or is wholly zinc, is considered to be within the scope of this invention.

The first protective layer to be applied over the zinc rich surface is a thermosetting polymeric coating layer. In many cases, this thermosetting polymer will be a non-epoxy polymer. However, it is considered to be within the scope of this invention to use epoxy thermosetting polymers for the first coating layer because that will increase the compatibility of the first polymeric layer and the top coat, that is also epoxy polymer based. The first layer is per se known and its use is the subject of U.S. Pat. No. 6, 203,928. It can applied by any convenient technique, however, it is preferably applied in the form of a powder that has been disposed on the surface to be protected and has been subjected to a d.c. applied voltage with differing polarities applied to the powder and to the substrate, respectively. Under the influence of the d.c. polarity and heat, the powder is melted and caused to flow across the zinc rich surface whereby forming a film that substantially covers the surface and adheres to it, preferably tenaciously adhers to it.

The first thermosetting polymeric layer is desirably as thin as possible consistent with it being sufficient to cover the entire zinc rich surface. It need only be sufficiently thick to prevent pinholes. It should be applied in a manner that will tend to prevent surface crazing or cracking, which generally means applying a very thin coating. The polymeric composition of this first layer must be a material that weathers well and will resist substantial shrinkage or expansion as a function of the temperature and/or humidity to which it is subjected. Further, this primary polymeric coating layer must adhere well to both the zinc rich substrate surface as well as to the epoxy polysiloxane polymeric top coating layer that will later be applied. Not only must this primary coating layer be able to withstand outdoor temperature ranges of about −20 to +100° F., but it also must be able to withstand the adverse effects of high or low humidity and substantial salt concentrations in the atmosphere. In other words, this primary coating should be resistant to external damage, such as occurs when a material is subjected to alternating thermal shrinkage and expansion, that might be caused by the environment in which it is intended to operate as well as internal damage such as depolymerization that can be cause by the ambient atmosphere having too high an acid content.

As applied to a parking meter as one example of an outdoor object in need of protection, or other outdoor token or credit card accepting device, or a device that is activated by wireless electronic means, such as by receiving a signal from a cell phone or a remote energy (e.g. infra red) beam, a zinc layer can be disposed on the surface of all or part of a parking meter in need of protection. In a preferred method, a clean, bare oxidizable ferrous surface of the part to be hot zinc coated is suitably subjected to centrifugal force after the hot zinc layer has been applied thereto in fluid form and while the liquid zinc layer is cooling. The oxidizable ferrous part(s) are galvanized, suitably in a conventional manner, i.e. washed in hydrochloric acid (HCl), then pickled in a zinc-lead (Zn—Pb) bath that also preferably contains some aluminum (Al), and may then be washed in a water bath that preferably includes some dissolved chromate ($CrO_4$). It is important that this zinc coated ferrous part not be quenched in oil of soap solution as this would impregnate the newly hot galvanizing layer with contaminant(s) that would later, prior to applying further surface coatings, have to be removed. The thus galvanized parts are then dried, perhaps for many days, but at least for considerably more than six (6) hours.

The galvanized parts are then coated with a, preferably non-epoxy, organic, polymeric material that can be applied from a powder that responds to an electrostatic field, is meltable, and is heat curable to form a fully covering thermosetting polymeric layer that adheres to the zinc substrate. It is to be noted that the applied polymeric powder is in a thermoplastic condition when it is applied to the zinc rich surface because it will be melted and spread across the surface. The heating and cooling of the spread polymer causes it to cure and become thermosetting. The powder is applied directly to the galvanized layer, that is disposed on a cast iron substrate surface, for example, without requiring the intermediate use of a phosphoric acid wash. Phosphoric acid is preferably avoided because it can be detrimental to the application and adhesion of a zinc surface coating. The zinc substrate can react with the phosphoric acid to form, and randomly distribute, small amounts of zinc phosphate crystals over the substrate surface prior to application of the polymeric powder. These crystals lie between the zinc substrate and the primary polymeric coating and form places where the coating does not adhere to the zinc because the zinc phosphate crystals are in the way. Thus there are created spots where the primary polymeric coating can be lifted from the zinc substrate surface thereby compromising the integrity of the coating.

By centrifuging the parking meter parts after applying hot liquid form zinc to the part surface and as cooling down occurs, excess zinc is removed from the parts to leave a zinc surface covering the substrate that may be somewhat smooth and somewhat rough. As noted above, oil of soap solution quenching should not be implemented. The roughness of the zinc surface when applied in this manner is generally sufficient to enable the polymeric primary coating to be applied thereto and to strongly adhere thereto. The primary, polymeric coating is preferably not an epoxy resin because conventional epoxy resins generally do not have the physical properties necessary to withstand the harsh environmental conditions to which parking meters and other similar outdoor metal based consoles are exposed.

It is pointed out, however, that in the instant invention, a second protective layer is intended to be disposed over and adhered to the primary polymeric layer. The second layer will tend to protect the primary polymer layer from direct contact with the harsh environment to which parking meters and similar devices are ordinarily exposed. Therefore, while it is not preferred, because of the overcoat, the primary polymeric layer can have an epoxy resin component. The essential characteristic of the primary polymeric layer is that it has excellent adherence to both the zinc rich substrate and the epoxy polysiloxane top coating.

It has been found, through actual use and experimentation, that excellent adherence properties of both the zinc layer and the primary polymeric layer are attained as a result of the foregoing process. Theoretical analysis leads to the conclusion that a parking meter, or other suitable outdoor token, credit card or electronic wireless message accepting device, having a structural member that is suitably an oxidation susceptible ferrous metal on which a zinc layer has been deposited (or a structural zinc member) and that is covered by an organic, electrical insulating, coating that has been applied electrostatically from a powder, has a life expectancy of 60 to 70 years. Adding the top coating of this invention increases the effective life still further. If the housing is vandalized, for example, by a knife cut, the galvanized zinc layer "grows" into the cut created by a knife, to preserve the superior corrosion resistant characteristics of the housing part of the parking meter or other similar outdoor device.

According to this invention, the powder applied polymer is preferably selected from the group consisting of polyurethanes, acrylics and nylons to form the primary coating. As noted, epoxy polymers can also be used alone or in combination with other polymers because of the application of a top coating there over. The primary coating has, in the past, been desirably of a thickness of at least about 2.5 mils. If the primary coating does not have a further top coating applied over it, at thicknesses less than about 2.5 mils the zinc layer may not be completely covered or may be very easily exposed by vandalism. If the powder coating thickness exceeds about 5 mils, excessive amounts of powder that are used to make such a thick polymer film increases powder cost unnecessarily and may cause flaking of the powder. A balance must be struck. The primary polymer coating must be thick enough to completely cover the zinc substrate without pin holes, yet thin enough not to be excessively expensive and subject to flaking.

The top coat polysiloxane resin polymer is suitably produced from a composition comprising a resin component that is itself a multi-component blend. The first component is a mixture of:

(1) a non-aromatic epoxy resin having at least two 1,2-epoxy groups. It is preferred to use non-aromatic, hydrogenated epoxy resins that contain at least one and preferably two epoxy groups per molecule. It is preferred to use liquid, rather than solid, epoxy resins;

(2) a polysiloxane having pendant groups selected from the group consisting of hydroxyl, alkyl, aryl, and alkoxy groups, wherein said alkyl aryl, and alkoxy groups each have up to about six (6) carbon atoms; and terminal groups selected from the group consisting of hydrogen, alkyl, and aryl groups, wherein said alkyl and aryl groups have up to about six (6) carbon atoms; and wherein the polysiloxane has a molecular weight range of about 400 to 2000.

(3) an organooxysilane such as has the following structural formula:

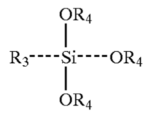

wherein $R_3$ is selected from the group consisting of alkyl and cycloalkyl having up to six (s) carbon atoms, and aryl groups having up to about ten (10) carbon atoms; and the several $R_4$'s are independently selected from the groups consisting of alkyl, hydroxyalkyl, alkoxyalkyl, and hydroxyalkoxyalkyl groups containing up to about six (6) carbon atoms.

The second component is a difunctional amine hardener, or a mixture of a difunctional amine and an aminosilane. The third component is a suitable hardening catalyst. Optionally, a pigment or dye may be included in the top coating composition. Water is an important component of the top coat composition.

It is preferred that the top coating be as thin as practical. Again, coatings in the range of about 2 to 5 mils have been found to work effectively. The whole of the multi-layer protective coating should be about 4 to 6 mils in thickness.

In another aspect of this invention, a zinc rich thermosetting epoxy polymer coating is applied to a ferrous metal substrate that is susceptible to oxidation. In one embodiment, this zinc rich epoxy coating is applied over a cast iron substrate in place of a phosphate-chromate coating that is the industry standard. In another, related embodiment, the multi layer coatings of this invention are given added toughness to increase their durability and longevity by applying both the phosphate-chromate treatment directly on the substrate metal surface followed by coating with a zinc rich epoxy thermosetting polymer. One such zinc rich epoxy thermosetting composition is sold commercially by the Morton Company under the trade name Zinc Rich Gray 13-7004.

Alternatively, it is considered to be within the scope of this invention to apply 100% solids epoxy sealer over a cleaned ferrous metal surface or composite substrate in need of protection. This coating layer acts to withhold contact of the oxidation prone ferrous metal surface with atmospheric oxygen and water, either in vapor or liquid form. One such 100% solids formulation is commercially sold under the trade name Ameron Sealer. The previously described powder electrostatic coating can be applied over this epoxy sealer, and the epoxy polysiloxane top coat described herein can be applied over that intermediate polymer layer.

Further, alternatively, a liquid organozinc compound or composition can be disposed on a previously thoroughly cleaned substrate surface. The remaining layers of surface coating materials that have been set forth herein are suitably applied over that primer.

The method of this invention is, in one embodiment, used to refurbish articles which, prior to the refuirbishing, have undesirable oxidation coatings on the ferrous or other metallic base. The undesirable coatings are loosened, for example by burning or sand blasting, from the ferrous base, to provide loose and flaked particles of the undesirable coating materials on the article surface. The loose and flaked particles are mechanically removed from the article surface so a bare surface of the ferrous base is clean and exposed. Preferably, the loose and flaked particles are removed from the article surface by grit brush blasting with a mixture of aluminum oxide grit having different sizes, optimally in the range of 24 to 30 gauge. In a preferred embodiment a deoxidizer, such as Oakite Deoxidizer LNC, is applied to the mechanically cleaned part before it is further processed. Iron phosphate, such as is sold commercially as Oakite CrysCoat 2187, is then applied, followed by chromium sealing (Oakite FH3) of the surface. After these sequential treatments, the thus prepared surface can be subjected to a powder coating, as aforesaid or air dried prior to applying further protective coatings.

When the articles are cast iron parts of parking meter housings or steel parts of token or credit card accepting device housings subject to abuse and adverse environmental conditions, the parts can be machined for correct tolerances to enable the parts to fit properly together during reassembly, after the undesirable coatings thereon have been removed and before the parts are zinc coated.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A structure, intended for disposition in ambient atmosphere, comprising:

at least one part having a substrate comprising an oxidizable ferrous metal surface that is subject to deterioration upon exposure to ambient atmosphere, A. a first coating comprising zinc disposed on and adhered to at least a portion of said oxidizable ferrous metal surface, B. a second coating directly covering at least a portion of said first coating and adhered thereto, wherein said second coating comprises a thermosetting polymer that has been applied by, coating at least a portion of said first coating with a powder comprising a composition that is convertible, by the application of heat, into said thermosetting second coating;

subjecting said powder and said substrate to electrostatic charging with opposite d.c. voltage polarities; and heating the powder while under the influence of said electrostatic charging to an extent sufficient to melt said powder and cause it to spread over a desired area of said first coating and to cure said melted powder material to convert it to a thermosetting polymer that is adherent to said first coating; and C. a third coating directly covering at least a portion of said second coating and adhered thereto, wherein said third coating comprises an epoxysiloxane polymer.

2. The structure of claim 1, wherein said epoxysiloxane polymer has been produced by interreacting:

a first component comprising a mixture of:

(1) a non-aromatic epoxy resin having at least two 1,2-epoxy groups;

(2) a polysiloxane having pendant groups selected from the group consisting of hydroxyl, alkyl, aryl, and alkoxy groups, wherein said alkyl, aryl, and alkoxy groups each have up to about six (6) carbon atoms; and terminal groups selected from the group consisting of hydrogen, alkyl, and aryl groups, wherein said alkyl and aryl groups have up to about six (6) carbon atoms; and (3) an organooxysilane having the following formula:

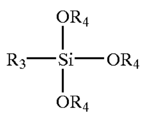

wherein $R_3$ is selected from the group consisting of alkyl and cycloalkyl groups having up to six (6) carbon atoms, and aryl groups having up to about ten (10) carbon atoms; and each $R_4$ is independently selected from the group consisting of alkyl, hydroxyalkyl, alkoxyalkyl, and hydroxyalkoxyalkyl groups containing up to about six (6) carbon atoms;

a second component comprising at least one of difunctional amine hardener, or a mixture of difunctional amine and an aminosilane hardeners; and a third component comprising a hardening catalyst;

wherein said composite coating is sufficiently thick that substantially no pinholes exist therein and is sufficiently thin as not to craze or crack under widely divergent ambient weather conditions.

3. The structure of claim 2, wherein the non-aromatic epoxy resin is a liquid.

4. The structure of claim 2, wherein the non-aromatic epoxy resin is a non-aromatic, hydrogenated epoxy resin.

5. The structure of claim 4, wherein the non-aromatic epoxy resin has two epoxy groups per molecule.

6. The structure of claim 2, wherein the molecular weight of the polysiloxane is about 400 to 2000.

7. The structure of claim 1 wherein said powder is selected from the group including polyurethane, acrylics and nylon.

8. The structure of claim 7 wherein the second coating has a thickness of not more than about 4 mils.

9. The structure of claim 1 wherein the composite coating has a thickness of up to about 6 mils.

10. The structure of claim 1, wherein said third coating contains a pigment.

11. A housing of a parking meter or other token, credit card, or wireless electronic signal accepting structure, subject to abuse and adverse environmental effects, the housing comprising:

at least one part having an exposed zinc surface;

a coating of electrically insulating organic non-epoxy thermosetting polymer directly covering and adhered to at least a portion of the zinc surface; and a top coating comprising an epoxysiloxane polymer, wherein said epoxysiloxane polymer substantially covers, and is adhered to, said thermosetting polymer coating.

12. The parking meter housing of claim 11, wherein said top coating comprises an interpolymerization product of reacting:

a first component comprising a mixture of:

(1) a non-aromatic epoxy resin having at least two 1,2-epoxy groups;

(2) a polysiloxane having pendant groups selected from the group consisting of hydroxyl, alkyl, aryl, and alkoxy groups, wherein said alkyl, aryl, and alkoxy groups each have up to about six (6) carbon atoms; and terminal groups selected from the group consisting of hydrogen, alkyl, and aryl groups, wherein said alkyl and aryl groups have up to about six (6) carbon atoms; and (3) an organooxysilane having the following formula:

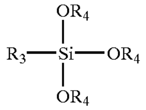

wherein $R_3$ is selected from the group consisting of alkyl and cycloalkyl groups having up to six (6) carbon atoms, and aryl groups having up to about ten (10) carbon atoms; and each $R_4$ is independently selected from the group consisting of alkyl, hydroxyalkyl, alkoxyalkyl, and hydroxyalkoxyalkyl groups containing up to about six (6) carbon atoms;

a second component comprising at least one of difunctional amine hardener, or a mixture of difunctional amine and an aminosilane hardeners; and a third component comprising a hardening catalyst.

13. The parking meter housing of claim 12, wherein the molecular weight of the polysiloxane is about 400 to 2000.

* * * * *